FLUID FLOW CONTROL VALVE

Original Filed July 1, 1969 5 Sheets-Sheet 1

INVENTOR.
JAMES OTTO BYERS
BY W. L. Hunter
ATTORNEY

FLUID FLOW CONTROL VALVE

Original Filed July 1, 1969 5 Sheets-Sheet 2

INVENTOR.
JAMES OTTO BYERS
BY W. L. Hunter
ATTORNEY

FLUID FLOW CONTROL VALVE

Original Filed July 1, 1969 5 Sheets-Sheet 3

INVENTOR.
JAMES OTTO BYERS
BY
W. L. Hunter
ATTORNEY

FLUID FLOW CONTROL VALVE

Original Filed July 1, 1969 5 Sheets-Sheet 4

INVENTOR.
JAMES OTTO BYERS
BY W. L. Hunter
ATTORNEY

FLUID FLOW CONTROL VALVE

Original Filed July 1, 1969 5 Sheets-Sheet 5

INVENTOR.
JAMES OTTO BYERS
BY
W. L. Hunton
ATTORNEY

United States Patent Office

Re. 27,758
Reissued Sept. 11, 1973

27,758
FLUID FLOW CONTROL VALVE

James Otto Byers, Racine, Wis., assignor to Sanders Associates, Inc., Nashua, N.H.

Original No. 3,561,488, dated Feb. 9, 1971, Ser. No. 838,062, July 1, 1969. Application for reissue Oct. 24, 1972, Ser. No. 300,013
Int. Cl. F16k *11/07*
U.S. Cl. 137—625.62 34 Claims

Matter enclosed in heavy brackets [ ] appears in the original patent but forms no part of this reissue specification; matter printed in italics indicates the additions made by reissue.

ABSTRACT OF THE DISCLOSURE

A two-stage fluid flow control valve is described in which the rate of flow of fluid to the load depends solely on the input signal and is independent of load pressure. The second stage spool and housing are formed so that upon movement of the spool in response to fluid pressure from the first stage, two different-sized passageways are opened simultaneously to the load conduit. The smaller communicates with the *fluid pressure from the first stage while the larger communicates with the* second-stage fluid pressure source. Analysis shows that this results in a fixed flow rate for each value of input signal.

FIELD OF THE INVENTION

This invention relates generally to fluid flow control valves, sometimes called servo valves whether or not they are part of a closed loop system, but which in any event respond to an input signal to control the flow of fluid to a load such as a hydraulic actuator. More particularly, the invention relates to multistage fluid flow control valves in which the rate of flow of fluid to the load is independent of the load pressure.

BACKGROUND OF THE INVENTION

In many applications of fluid flow control valves, it is desirable for the rate of flow of fluid to the load to be independent of load pressure. In other words, it is desirable that for each magnitude of input signal there be a corresponding rate of flow of fluid to the load, regardless of load pressure. In the past, many valves have been designed in an attempt to achieve this desirable result. Most have involved feedback of some sort in which the load pressure and/or the actual rate of flow to the load have been sensed and a signal generated which is fed back either to the second stage or to the first stage of the valve. However, none of these valves have been entirely satisfactory. Some have been too complex. Some have been expensive because of the precision required in their manufacture. Some have been very sensitive to wear of the metering lands. Some have been too inaccurate in their compensation for load pressure.

It is a general object of the present invention to provide a fluid flow control valve in which the rate of flow of fluid to the load is independent of the load pressure.

A subsidiary object is to provide such a valve in which feedback from the load is not required.

Another object is to provide a two-stage valve in which the rate of flow of fluid to the load is directly proportional to the rate of flow of fluid through the first stage.

Another object is to provide a two-stage valve in which exact spacing of the second stage metering lands is not required.

Another object is to provide a valve which is not unduly sensitive to wear of the metering lands.

SUMMARY OF THE INVENTION

In accordance with the invention, the second-stage housing and spool are formed so that, when this spool is displaced from a reference position by a control pressure from the first stage, a first passageway is opened which allows fluid to flow from the first stage to the load port. This flow tends to reduce the control pressure. An opposing bias pressure, which may be obtained from the first stage or from the fluid supply for the second stage, cooperates with the control pressure to position the spool so that for any input signal to the first stage, there is a corresponding rate of flow of fluid from the first stage to the load port. The spool and housing are also formed so that a second passageway is opened simultaneously with the first which allows fluid to flow from the second-stage supply to the same load port. The two passageways have a predetermined, fixed [ration] *ratio* of cross-sectional areas and the control pressure and the second-stage supply pressure are made equal with the result that the flow through the second passageway is proportional to that through the first. Accordingly, the rate of flow of fluid to the load depends solely on the input signal and is independent of load pressure.

DETAILED DESCRIPTION

For a clearer understanding of the invention, reference may be made to the following detailed description and the accompanying drawing in which.

Figure 1:
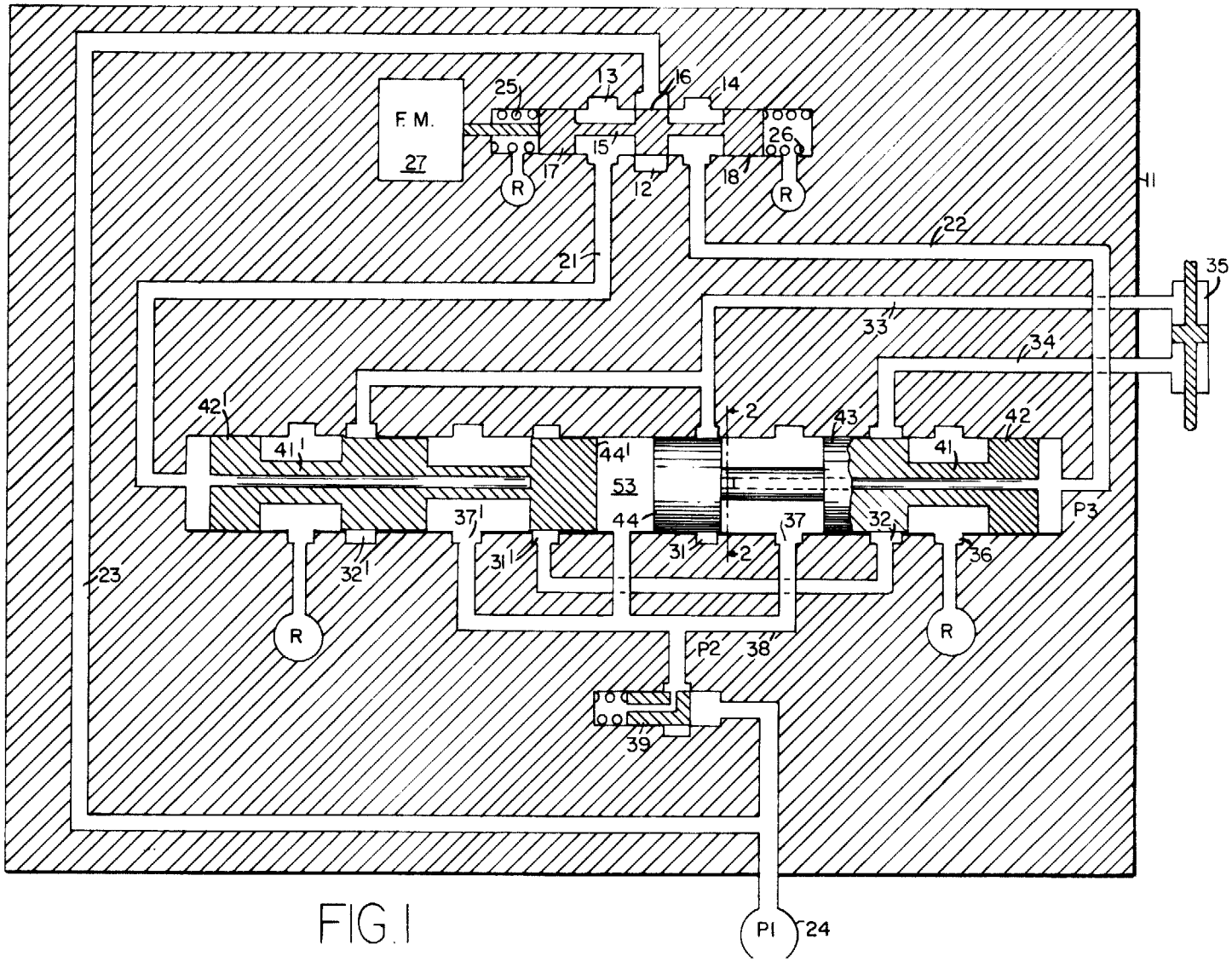
FIG. 1 is a schematic cross-sectional view of a flow control valve incorporating the invention.

Referring first to FIG. 1, a housing 11 is formed with a hollow cylinder which, in turn, is formed with a centrally located port 12 and with ports 13 and 14 on either side thereof. Within the cylinder is a spool 15 formed with a central land 16 which, when in the neutral position, is "line on line" with the port 12. The spool 15 also includes lands 17 and 18 on either end thereof. Ports 13 and 14, which are positioned on either side of land 16, are connected by conduits 21 and 22 respectively to the second stage of the valve. The central port 16 is connected by means of a conduit 23 to a source [central port 16 is connected by means of a conduit 23 to a source] of fluid under pressure 24, having a pressure designated as P1. Centering springs 25 and 26 bear against opposite ends of the cylinder and against lands 17 and 18 respectively, and normally hold the spool in the central position shown. The end spaces containing these springs are connected to the fluid return, or sump. A force motor 27 is mechanically connected to the spool 15 and acts in the usual manner to accept an input signal, and in response thereto, to displace the spool 15 from the reference position shown.

The housing 11 is also formed with a second cylinder including ports 31 and 32 connected by means of conduits 33 and 34 respectively to an actuator 35 which is the useful load device. The second cylinder also includes a port 36 connected to the return and a port 37 connected by means of a conduit 38 to the low-pressure side of a pressure-reducing valve 39, the high-pressure side of which is connected to the source 24. The pressure of the fluid applied to the port 37 is designated P2. The second cylinder contains a spool 41 formed with lands 42, 43, and 44. To the left of the spool 41, as shown in FIG. 1, is a second spool which is a mirror image of the spool 41 and whose various portions are designated by similar but primed reference characters. The conduits 21 and 22 are connected to the left and right ends respectively of the cylinder so that the fluid pressures therein bear against lands 42' and 42 respectively. The space between lands 44 and 44' is connected to the conduit 38 so as to be subjected to the pressure P2. Port 32' is connected to the port 31 and port 31' is connected to the port 32. The spool 41 is formed with a central bore which extends from the right end thereof as far as the land 44. Similarly, the spool 41' is formed with a bore which extends from the left end thereof as far as the land 44'.

Figure 2:
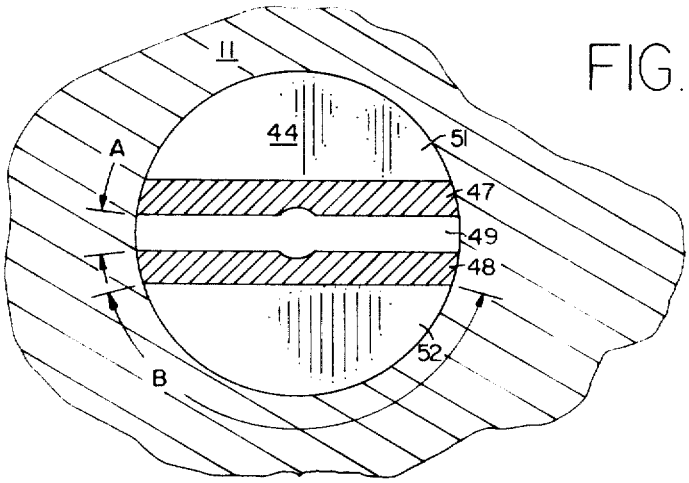
FIG. 2 is a cross-sectional view taken on the line 2—2 of FIG. 1.
Figure 3:
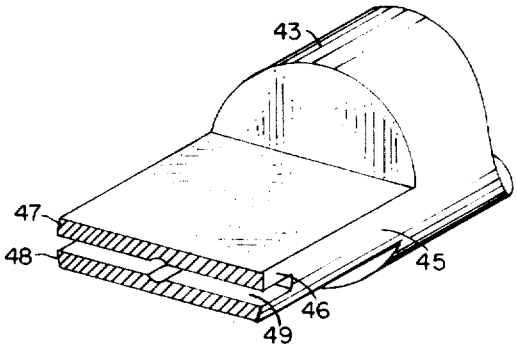
FIG. 3 is a pictorial view of one of the elements of the valve of FIG. 1 before its assembly with the remaining elements.

An important part of the present invention is the portion of the spool between lands 43 and 44. As best shown in FIGS. 2 and 3, a generally flat central portion 45 extends from the land 43. At the extreme left end, it is formed with a slot 46 which divides this portion into two tongue members 47 and 48. The slot 46 communicates with the bore in the spool. This portion of the spool is first made as a component separate from the land 44, as shown in FIG. 3. It is then placed against the flat right-hand face of [he] *the* land 44 and brazed or welded thereto. When placed within the cylindrical chamber in the housing 11, there are defined a chamber 49 between the tongue members 47 and 48 and chambers 51 and 52, between the tongue members 47 and 48 and the cylinder walls.

In the reference or neutral position of the valve as shown in FIG. 1 the right-hand edge of the land 44 is approximately on line with the right-hand edge of the port 31 and just occludes it. It can be seen that if the spool 41 be moved to the left, a first passageway will be opened between the chamber 49 and the port [32] *31* and at exactly the same time a second passageway will be opened between the chambers 51 and 52 and the port 31.

Also in the neutral position of the valve shown, the pressure in the conduit 22, designated P3, will be equal to the pressure P2 in the chamber 53 between the lands 44 and 44'. This must necessarily be so because if the pressure P3 should tend to increase above P2, the spool 43 would move slightly to the left thereby opening the passageway between the chamber 49 and the port 31 and allowing fluid to flow. This flow would then reduce the pressure P3 until it equalled the pressure P2. On the other hand, if P3 should drop below P2, then the spool 41 would be moved to the right and flow would be shut off and the leakage through the first stage would tend to raise the pressure P3 until it equalled P2. An exactly similar sequence occurs with the spool 41' with the result that, at equilibrium, the leakage passed by the first stage spool 15 flows through the second stage spools 41 and 41', both of which are displaced slightly so that fluid flows from the ports 31 and 31' to the ports 32' and 32 respectively. It is to be noted that this flow in no way depends upon the pressure in the load conduits 33 and 34.

Let us assume that a signal is now applied to the force motor 27 to displace the spool 15 to the left. This will tend to increase the pressure in conduit 22 and the second stage spool 41 will be shifted to the left. Then fluid will flow from the chamber 49 into the port 31. When this flow is sufficient to reduce the pressure P3 to equal P2, the spool 41 will be in equilibrium. A certain amount of fluid will be flowing from the conduit 22 to the port 31. Let us designate this flow as $Q_1$. As best shown in FIG. 2, it is seen that this flow occurs through a passageway whose cross-sectional area is proportional to the distance A between the tongue members 47 and 48. At the same time, fluid will also flow from the chambers 51 and 52 to the port 31. This flow will be through a passageway whose cross-sectional area is proportional to the distance B. Since the pressure in chambers 51 and 52 is also equal to P2, the flow of fluid from the second-stage supply will be in the ratio of these areas or will be equal to $Q_1 \times B/A$. The total flow to the load conduit 33 will be equal to $Q_1$ plus $Q_1 \times B/A$ regardless of the load pressure For any input signal to the force motor 27 there is a definite corresponding flow of fluid through the first stage and therefore there is also a corresponding proportional flow through the second stage.

It is to be noted that, as previously mentioned, the second-stage spools are automatically adjusted at the neutral position so that the leakage rate of the first stage is passed. Therefore, exact spacing of the various lands is unnecessary. Similarly, wear of the metering lands has little or no effect. Likewise, it is not necessary that the lands 44 and 43 open the ports 31 and 32 respectively at exactly the same time because nothing can flow until both are open.

It is also to be noted that the pressure drop across the first-stage land 16 is fixed and equal to the pressure drop across the valve 39 which is equal to P1–P2.

It is also to be noted that in this particular valve there is no "dead" space at all. As soon as there is a signal, fluid will flow to the load device.

It is also to be noted that the gain of the valve can be varied by varying the setting of the pressure reducing valve 39. Reduction of the pressure P2 with respect to P1 makes for greater sensitivity because the pressure drop across the first stage is P1 minus P2. However, P2 must be great enough to provide adequate flow of the fluid to the load.

Figure 4:
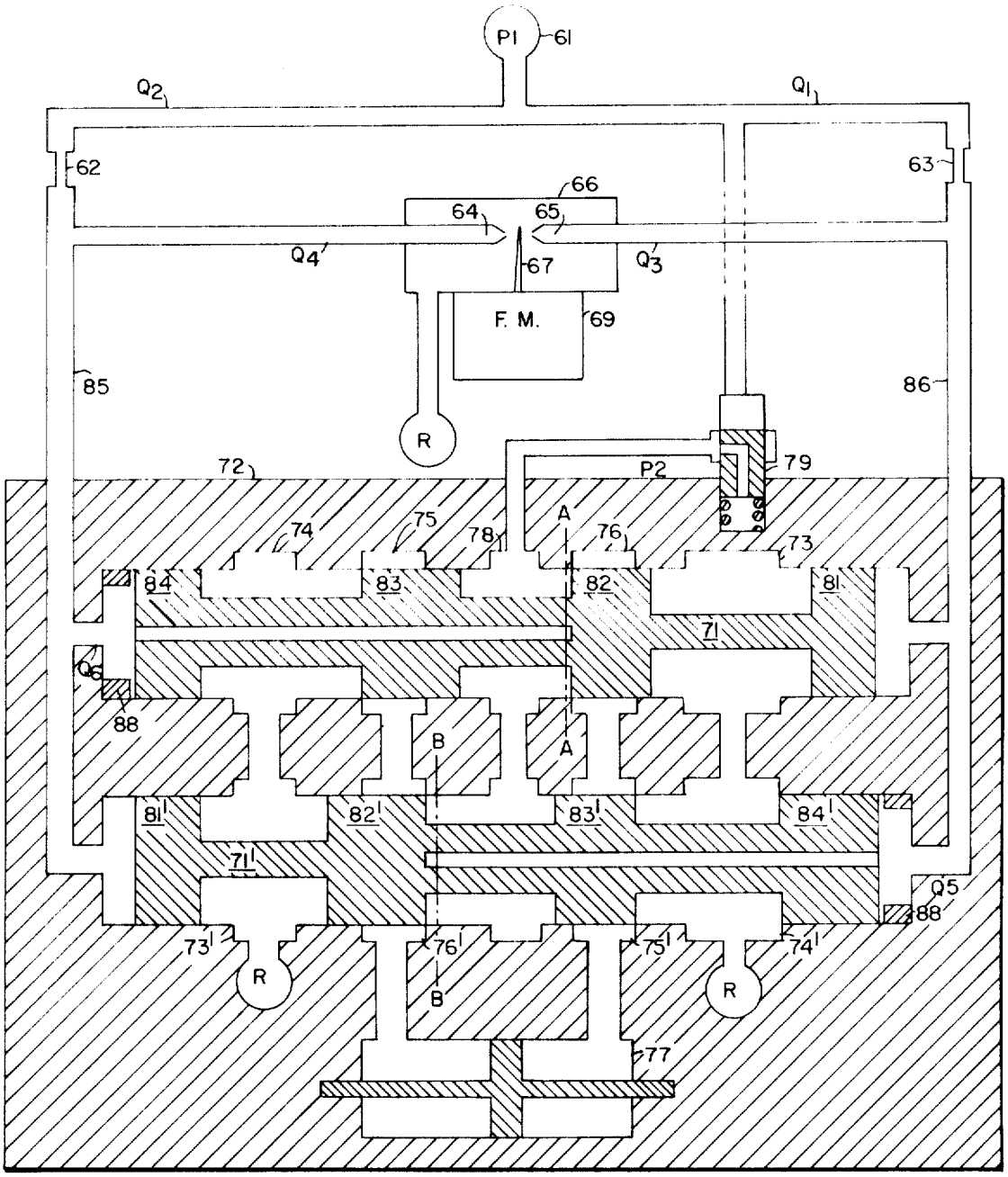
FIG. 4 is a schematic cross-sectional view of another flow control valve incorporating the invention.

Another embodiment of the invention is shown in FIG. 4. In this embodiment, the first stage is a flapper valve instead of a spool valve. A source 61 of fluid under pressure is connected through two restrictors 62 and 63 to nozzles 64 and 65 respectively positioned within a chamber 66 and the flow from which nozzles is directed to opposite side of a flapper or vane 67. The chamber 66 is connected to the return or sump. A motor 69, which may be either a force motor or a torque motor, controls the position of the vane 67.

The second stage includes a spool 71 which operates in a hollow cylinder formed in a housing 72 formed with ports 73 and 74 connected to the return and with ports 75 and 76 connected to opposite sides of a load device 77. A port 78 is connected to the low-pressure side of a pressure reducing valve 79, the high-pressure side of which is connected to the source 61. As before, the pressure of the source will be denoted as P1 and that at the port 78 as P2. The spool 71 is formed with lands 81, 82, 83 and 84. Conduits 85 and 86 lead from the nozzles 64 and 65 respectively to the left and right ends respectively of the spool 71. The spool 71 is formed with a bore which extends from the left hand end, as viewed in FIG. 4 as far as the land 82. The section designated A—A is identical to that designated 2—2 in FIG. 1 and is as illustrated in FIG. 2. A stop ring 88 is placed to the left of the spool 71 to limit its leftward travel.

A second spool 71' is substantially identical to the spool 71 except that it is turned end for end with respect thereto. The various parts are designated by the same reference characters as those for spool 71 except that they are primed. The spool 71' operates in a similar cylinder formed with similar ports. Conduits 85 and 86 are connected to the left and right ends of the spool 71 respectively. The section designated B—B is identical to that designated A—A.

The neutral position of the first stage is defined as the position of the flapper 67 at which the pressure in the conduits leading to the orifices is the same provided there is no flow, or are equal rates of flow, in the conduits 85 and 86. When these conditions are met, the spools 71 and 71' will be in their neutral positions substantially as shown. For example, if the spool 71 were displaced slightly to the right, then fluid would flow from the conduit 85 through the central bore to the port 76 thereby reducing the pressure on the left end of the spool 71 and allowing the pressure in the conduit 86 to return the spool 71 to its neutral position. The stop 88 prevents the spool from going too far to the left. Similarly, if the spool 71' were unbalanced, a similar sequence of events would return it to the neutral position. At this position there is no flow of fluid to the load 77.

Let us designate the rate of flow of fluid from the source 61 to the restrictor 63 as $Q_1$; that from the source 61 to the restrictor 62 as $Q_2$; that flowing through the orifice 65 as $Q_3$; that flowing through the orifice 64 as $Q_4$; that flowing into the right end of spool 71' $Q_5$; and that flowing to the left end of spool 71 as [spool] $Q_6$. Now, let us assume that the flapper 67 is displaced to the right. The pressure in the conduit 86 will tend to rise and this will displace the spool 71 to the left until it rests against its stop ring 88. The spool 71' will be displaced to the left and fluid will flow at the rate $Q_5$ to the load port 76'. When this flow is sufficient to reduce the pressure in the conduit 86 to that in the conduit 85 the spool 71' will come to rest. Since the source 61 applies pressure P1 to both of the restrictors 62 and 63, and since the pressure in conduits 85 and 86 are the same, it follows the $Q_1$ must equal $Q_2$. This being so, it likewise follows that $Q_4$ equals $Q_3$ plus $Q_5$. Therefore, for any position of the flapper 67 there is a corresponding flow rate $Q_5$ or $Q_6$ to the load regardless of the load pressure. The spools are automatically positioned until this is so. Then, to make the total flow of fluid to the load depend only on the position of the flapper, it is only necessary to adjust the pressure reducing valve 79 to make the pressure P2 equal to that in the conduits 85 and 86. This is done conveniently by adjusting valve 79 to make P2 equal to the pressure in conduits 85 and 86 when the flapper 67 is in its neutral position and there is no flow in these conduits. It is true that, as the flapper 67 is displaced from neutral causing fluid to flow in conduit 85 or 86, the pressure in these conduits falls. But it is also true that the output pressure of a valve such as valve 79 falls as the rate of flow through it increases. These two changes occur at approximately the same rate and accordingly the above adjustment makes P2 substantially equal to the pressure in conduits 85 to 86 throughout the entire range of operation. Then the total flow of fluid to the load will be directly proportional to $Q_5$ and $Q_6$ as the case may be and this flow rate is completely independent of load pressure.

It is to be noted that in this embodiment of the invention the opposing pressures which position the spool are both taken from the first stage of the valve rather than taking one from the first stage and the other from the supply to the second stage. It is also to be noted that there is no dead space in this embodiment either and that as soon as there is an input signal, fluid starts to flow to the load. It is also to be noted that since the spools position themselves in accordance with flow rates and pressure drops, there is automatic compensation for wear.

Figure 5:
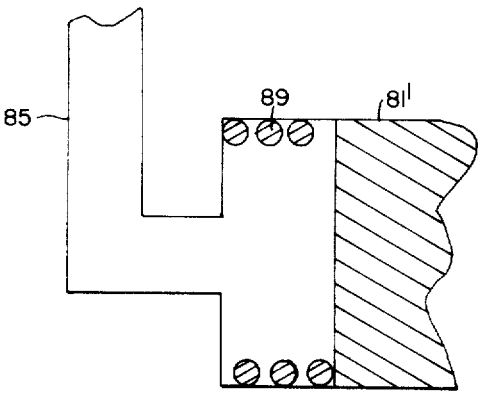
FIG. 5 is a fragmentary cross-sectional view of a modification of the valve shown in FIG. 4.

When operating certain types of load devices, it is desirable that there be a dead space, that is that there be no movement of the load device until the input signal has reached a predetermined amount, positive or negative. The embodiment of FIG. 4 can readily be modified to achieve such a condition. As shown in FIG. 5, a spring 89 is placed in the space between the left end of the land 81' and the end of the cylinder and a similar spring would be placed to the right of the land 81 of the spool 71. Then there would be no flow of fluid to the load until the input signal were sufficient to raise the pressure in one of the conduits 85 or 86 sufficiently to overcome the spring pressure.

Figure 6:
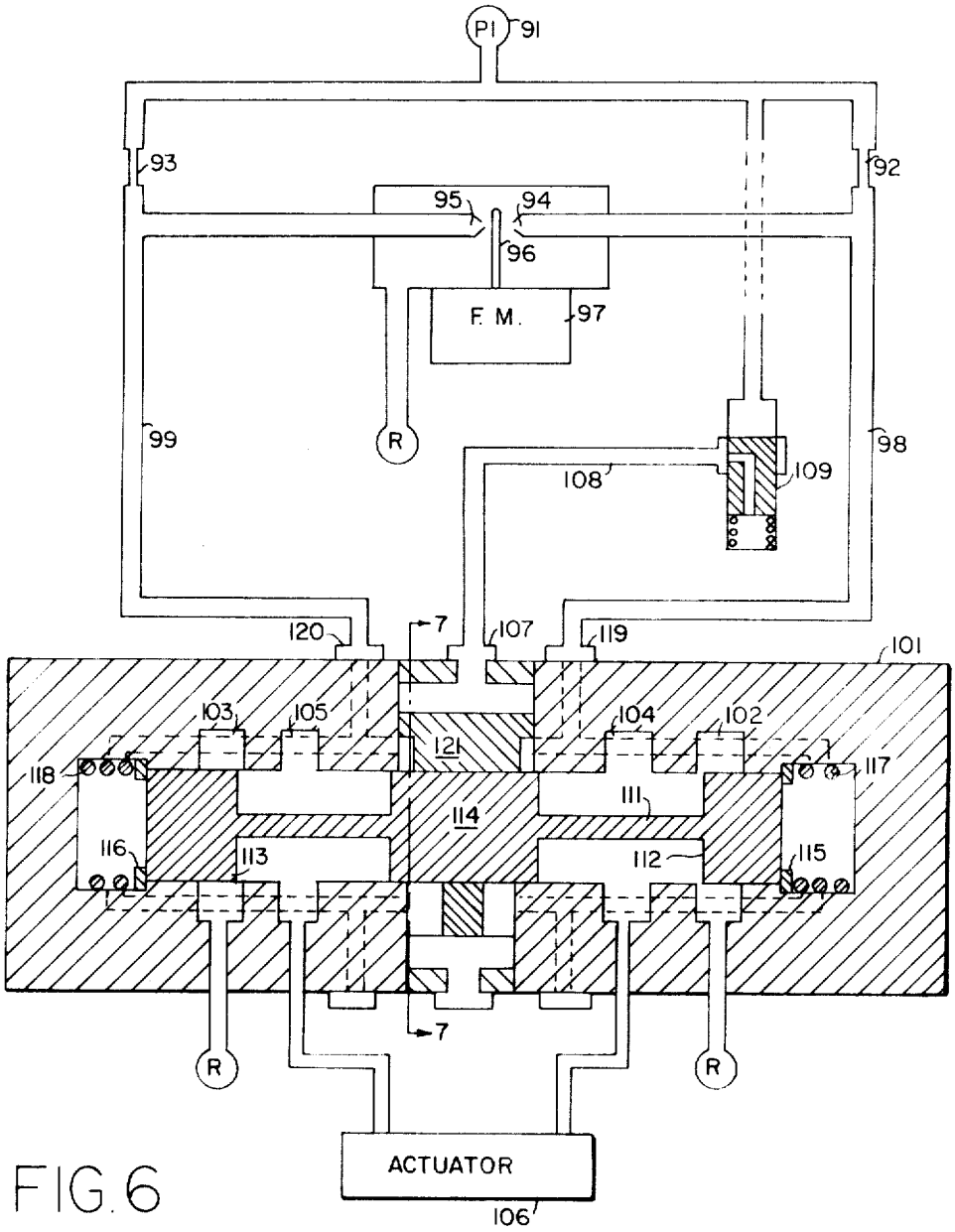
FIG. 6 is a schematic cross-sectional view of another valve incorporating the invention.

Referring now to FIG. 6, there is shown another embodiment of the invention. In this embodiment the pilot stage is also a flapper valve. A source of fluid 91 is connected to restrictors 92 and 93 which in turn are connected to nozzles 94 and 95 respectively, which act on opposite sides of a vane or flapper 96 which is positioned by a force motor 97. Conduits 98 and 99 lead from the nozzles 94 and 95 to the second stage.

The second stage includes a housing 101 in which is formed a hollow cylinder and which is also formed with ports 102 and 103 leading to the return; with ports 104 and 105 communicating with the load device 106; and with a port 107 to which is connected a conduit 108 leading to the low-pressure side of a pressure-reducing valve 109, the high-pressure side of which is connected to the source 91.

Within the cylinder there is a single piston 111 formed with a land 112 on the right-hand end, a land 113 on the left end, and with a central land 114. Both ends of the cylinder are stepped as shown, defining end spaces, in which washers 115 and 116 are placed. A pair of springs 117 and 118 are placed in the right and left end spaced respectively and bear against the washers 115 and 116 which in turn bear against the lands 112 and 113 so as to center the spool 111. The conduits 98 and 99 communicate with ports 119 and 120 respectively, which in turn communicate, by means of internal passageways, with the end spaces containing the springs 117 and 118 respectively.

Figure 7:
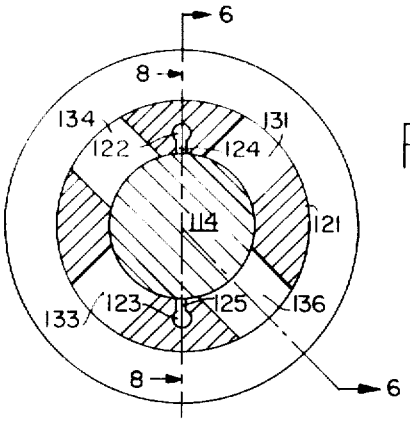
FIG. 7 is a cross-sectional view taken on the line 7—7 of FIG. 6.
Figure 8:
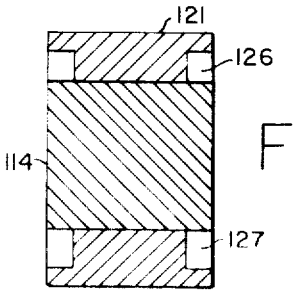
FIG. 8 is a cross-sectional view taken on the line 8—8 of FIG. 7.
Figure 9:
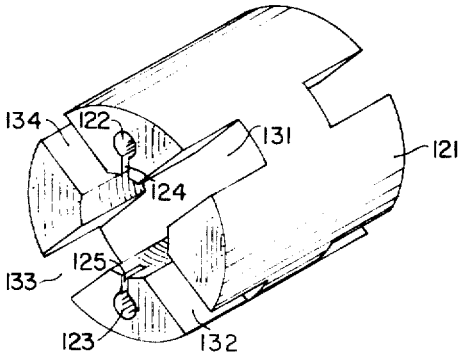
FIG. 9 is a pictorial view of one of the elements of the valve of FIG. 6 before its assembly to the remaining elements.

In this embodiment of the invention, the flow control chambers and passageways are formed in the housing instead of in the spool. A segment 121 is formed as a separate piece and later joined to the remaining parts. As shown in FIGS. 7, 8 and 9 the segment 121 is generally cylindrical in shape and has a central cylindrical bore. Each end face has formed therein two diametrically opposite holes 122 and 123 which extend inward a short distance. Slots 124 and 125 communicate with these holes and with the central bore. These holes and slots together with the land 114 of the spool 111 define chambers. As shown schematically in FIG. 6 by dotted lines the holes 122 and 123 communicate with the [part] *port* 120 and the holes 126 and 127 on the other side communicate with the port 119.

Each end of the segment 121 is also formed with four recesses 131, 132, 133 and 134, each of which extends completely through the segment from the outside to the central bore. These recesses cooperate with the land 114 to define chambers. All of these chambers communicate with the port 107 and the conduit 108.

As previously mentioned, the segment 121 is made as a separate piece and then welded or brazed to the flat faces of the housing 101. It is apparent that, as the spool 111 is displaced one way or the other, the chambers defined by the holes 122, etc., and the chambers defined by the recesses 131, etc., are all opened simultaneously.

Let us assume that an input signal to the force motor displaces the flapper vane 96 to the right. This will tend to increase the pressure in the conduit 98 over that in the conduit 99 but nothing will happen until and unless the increase is large enough to overcome the spring 118. Then the spool 111 will be displaced to the left and fluid will flow from the conduit 98 through the port 119 and through the holes 126 and 127 and the load port 104 to the load device or actuator 106. The springs 117 and 118 are selected to have just enough strength to provide a usable dead space in the presence of very small signals.

Once this threshold is exceeded, the strength of the springs is low enough in relation to the usual pressure differentials so as not to appreciably affect the equalization of pressures and the position of spool 111 is soon stabilized with the pressures in conduits 98 and 99 substantially equal and with a definite rate of flow from conduit 98 to the load. As before, this rate of flow is determined solely by the signal to the force motor and is entirely independent of the back pressure of the load device 106. Also as before, the pressure-reducing valve 109 is adjusted to make the pressure in the conduit 108 equal to that in the conduits 98 and 99. Then, the total flow to the load will be directly proportional to the flow from the first stage through the conduit 98 in an amount determined by the flow through conduit 98 and by the [ration] *ratio* of the lengths of [he] *the* recesses 131–134 to the lengths of the slots 124–127, all as measured along the circumference of the cylindrical bore. More particularly, if the length of each recess [by] *be* denoted by R, the length of each slot be denoted by S, and the flow through conduit 98 (and the slots) denoted by $Q_7$, then, since there are four recesses and two slots, the total flow will be equal to $Q_7$ plus $Q_7 \times 2R/S$. As in the previously described embodiments, this flow likewise will be independent of load pressure.

Figure 10:
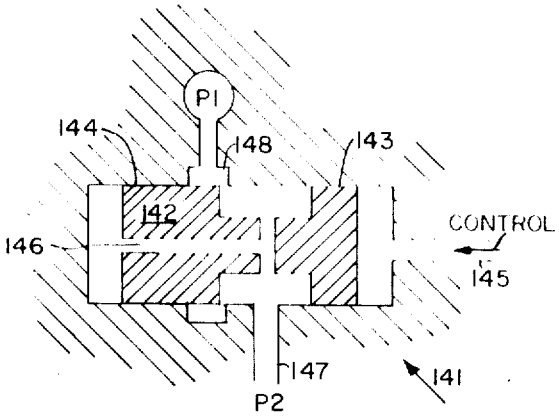
FIG. 10 is a cross-sectional view of an alternative form of pressure-reducing valve which may be used with the invention.

An alternative form of pressure reducing valve is indicated generally by the reference character 141 in FIG. 10. The valve comprises a piston 142, moveable in a cylinder, and formed with lands 143 and 144. The end space to the right of the land 143 communicates with a conduit 145 intended for connection to a source of control pressure. [the] *The* end space to the left of the land 144 communicates, by means of internal passageways 146 in the piston 142, with the space between the lands 143 and [155] *144*. A conduit 147 is connected to this space. A port 148 is connected to a source of fluid pressure.

In operation, the conduit 147 is connected to the device the pressure of which is to be controlled, that is, to port 78 of FIG. 4 or to conduit 108 of FIG. 6. The conduit 145 [si] *is* connected to the reference pressure, that is, to a conduit 86 of FIG. 4 or to conduit 98 of FIG. 6. Fluid from source P1 starts to flow to conduit 147 but also shifts the piston 142 to the right, thereby shutting off the flow. When the pressure P2 in conduit 147 tends to fall below that of conduit 145, the piston 142 is shifted to the left, opening port 148. An equilibrium position is soon reached with the pressure in conduit 147 equal to that in conduit 145, without requiring any flow of fluid from the conduit 145.

Use of the valve 141 instead of the valve 79 or the valve 109 makes the pressure P2 precisely equal to that in the conduits 86 or 98, thereby increasing the accuracy of the independence of flow rate from load pressure.

From the foregoing description, it will be apparent that applicant has provided an improved and simplified valve in which the rate of flow of fluid to the load is independent of load pressure. The embodiment of FIG. 6 is preferred in some cases, especially if a dead space in the neutral position is desired, because it contains but one spool and is therefore somewhat simpler. However, the embodiment of FIG. 1 or 4 may be preferred in some cases, because these embodiments may be made to have no dead space whatsoever and are much less affected by wear of the metering lands. In any case, however, the all important flow control chambers and passageways can be formed either in the spools or in the surrounding sleeves or housings.

It is to be understood that the showings in all of the figures of the drawing are highly schematic in order to show clearly the novel features of applicant's invention. Actual construction of valves in accordance with the invention will, of course, proceed along principles well known to those skilled in the art.

Although a number of embodiments have been described in considerable detail for illustrative purposes, many modifications can be made within the spirit of the invention. It is therefore desired that the protection afforded by Letters Patent be limited only by the true scope of the appended claims.

I claim:

1. A valve for controlling the flow of fluid to a load, comprising:

a first stage for generating a fluid control pressure in a conduit in response to an input signal;

a second stage including a housing formed with a hollow cylinder and a spool moveable therein,

*a source of fluid under pressure for said second stage,* said housing and spool being formed to define a passageway from said conduit to said load which passageway is closed when said spool is in its reference position and which opens as said spool is displaced therefrom;

means for applying a biasing fluid pressure, *substantially equal in pressure to that of said source,* to said spool to urge it in a first direction, and means for applying the control pressure in said conduit to said spool to urge it in the other direction whereby when said control pressure exceeds said biasing pressure said spool moves from its reference position until fluid flows through said passageway at a rate sufficient to reduce the pressure in said conduit to that of said biasing pressure.

2. A valve for controlling the flow of fluid to a load, comprising:

a first stage including a first source of fluid under pressure for generating a control pressure in response to an input signal;

a second stage including a housing formed with a hollow cylinder and a spool moveable therein to and from a reference position [in response to said control pressure for controlling the flow of fluid to said load];

a second source of fluid under pressure for said second stage, said second source being at a lower pressure than said first source; [and]

said housing and spool being formed so that, with said spool displaced from said reference position, they define first and second passageways communicating with said control pressure and with said second source respectively and both communicating with said load [.] ;

*means for applying a biasing pressure substantially equal to the pressure of said second source to said spool to urge it in a first direction; and*

*means for applying said control pressure to said spool to urge it in a second direction, whereby when said control pressure exceeds said biasing pressure said spool is displaced to that position at which the rate of flow of fluid through said first passageway is sufficient to reduce said control pressure to equal said biasing pressure.*

3. A valve in accordance with claim 2 in which said housing and spool are formed so that upon displacement of said spool from said reference position said first and second passageways open simultaneously.

4. A valve in accordance with claim 3 in which said second passageway is larger than said first passageway.

5. A valve for controlling the flow of fluid to a load, comprising:

a first stage for generating a fluid control pressure in a conduit;

a second stage including a housing formed with a hollow cylinder and a spool moveable therein, *a source of fluid under presure for said second stage,*

*means for applying a biasing force substantially equal to the pressure of said source to one end of said spool,* means for applying a force derived from said control pressure [and an opposing biasing force] to *the other end of* said spool, whereby said spool is moved when said forces are unequal;

said housing and spool being formed to define a first passageway from said conduit to said load which passageway is closed when said spool is in its reference position and which opens when said spool is displaced therefrom, whereby when said control pressure increases, said spool is displaced from said reference position and said passageway opens until the flow of fluid therethrough reduces said control pressure and the force derived therefrom to again equal said biasing force; and

[a source of fluid under pressure for said second stage,] said housing and spool also being formed to define a second passageway from said source to said load which passageway is opened and closed simultaneously with said first passageway.

6. A valve in accordance with claim 5 including means for substantially equalizing the pressure in said conduit and the pressure of said source.

7. A valve in accordance with claim 5 in which said biasing force is derived from said first stage.

8. A valve in accordance with claim 5 in which said biasing force is derived from said source.

9. A valve for controlling the flow of fluid to a load, comprising:

a first stage for generating a control fluid pressure in a conduit in response to an input signal; [and]

a second stage *including a source of fluid under pressure and also* including a housing formed with a hollow cylinder and a spool therein, said housing and spool being formed to define and open a first passageway from said conduit to said load upon displacement of said spool from a reference position.

*means for applying to one end of said spool a reference pressure substantially equal in pressure to that of said source,* said second stage including an operative connection *between the other end of said spool and* [to] said conduit for displacing said spool until the flow through the aforesaid passageway is sufficient to reduce said control fluid pressure to equal [a] *said* reference pressure [applied to said spool];

said housing and spool also being formed to define and open a second passageway from [a] *said* source of fluid under pressure to said load simultaneously with the opening of said first passageway.

10. A valve in accordance with claim 9 [win] *in* which said reference pressure is said source.

11. A valve in accordance with claim 9 [win] *in* which said reference pressure is derived from said first stage.

12. A valve in accordance with claim 9 in which said first stage comprises an additional hollow cylinder and spool.

13. A valve in accordance with claim 9 in which said first stage comprises a flapper cooperating with a pair of nozzles discharging fluid.

14. A valve in accordance with claim 9 in which said first stage includes an additional conduit and in which said control pressure comprises a differential pressure generated between said conduits in a sense determined by the sense of said input signal.

15. A valve in accordance with claim 14 including an additional spool operating in said hollow cylinder coaxially with the aforesaid spool and in which said conduits are operatively connected to opposite remote ends of said spools and in which said source is operatively connected to the space between said spools.

16. A valve in accordance with claim 14 including an additional hollow cylinder formed in said housing and an additional spool both substantially identical to the aforesaid cylinder and spool and in which said conduits are connected to opposite ends of both of said cylinders in such a sense as to render said spools and cylinders operative alternatively depending upon the sense of said input signal.

17. A valve for controlling the flow of fluid to a load, comprising:

a first stage for generating a control pressure in a conduit in response to an input signal;

a second stage including *a source of fluid under pressure and* a housing having a hollow cylinder and a spool movable therein to and from a reference position [in response to said control pressure];

*means for applying a biasing pressure substantially equal to the pressure of said source to said spool to urge it in a first direction; and*

[a source of fluid under pressure connected to said second stage;] *means for applying said control pressure in said conduit to said spool to urge it in a second direction;* [and] said cylinder and spool being formed to define first and second chambers communicating with said conduit and with said source, respectively, and which, upon movement of said spool away from said reference position, open simultaneously into a third chamber communicating with said load.

18. A valve in accordance with claim 17 in which said first and second chambers are defined by portions of said spool and the inner surface of said cylinder.

19. A valve in accordance with claim 17 in which said spool includes a land and in which said first and second chambers are defined by openings in said housing and the outer surface of said land.

20. A two-stage valve for controlling the flow of fluid to a load, comprising:

a first stage including a first source of fluid under pressure for generating a fluid pressure differential in first and second conduits in response to an input signal;

a second stage including a second source of fluid under a pressure less than that of said first source;

said second stage including a housing having a bore and a spool moveable therein to and from a reference position;

fluid connections from said first and second conduits to said bore at opposite ends of said spool; [and] said housing and spool being formed to define first and second chambers communicating with said first conduit and with said second source respectively and which, upon movement of said spool away from said reference position, open simultaneously into a third chamber through first and second passageways respectively, said third chamber communicating with said load, whereby when the pressure in said first conduit exceeds that in said second conduit, said spool is displaced from said reference position and opens said first passageway until the flow of fluid therethrough reduces the pressure in said first conduit to equal that in said second conduit [.] *and means for regulating the pressure of said second source to be substantially equal to the pressures existing in said first and second conduits when said last named pressures are equal to each other.*

21. A valve in accordance with claim 20 in which said housing and spool are also formed to define fourth, fifth and sixth chambers similar to said first, second and third chambers, respectively said fourth and fifth chambers communicating with said second conduit and with said second source respectively, said third and sixth chambers communicating with said load through different connections whereby when the pressure in said second conduit exceeds that in said first conduit, fluid flows from said fourth and fifth chambers through said sixth chamber to said load.

22. A valve in accordance with claim 20 in which said second source is supplied from said first source through a pressure-reducing valve.

23. A valve in accordance with claim 20 in which said first stage comprises a flapper valve.

24. A valve according to claim 20 in which said spool includes a central land and first and second lands on opposite sides thereof and in which said first and second chambers are defined by openings in said housing and the outer surface of said central land.

25. A valve in accordance with claim 24 including first and second centering springs bearing against said first and second lands respectively.

26. A two-stage fluid flow control valve for controlling the flow of fluid to a load, comprising:

a first stage including a first source of fluid under pressure for generating a fluid pressure differential in first and second conduits in response to an input signal;

a second stage including a second source of fluid under a pressure less than that of said first source;

said second stage including a housing having an axial bore and a spool moveable therein and fluid connection from said first and second conduits to said bore at opposite ends of said spool;

said housing including a centrally positioned segment formed with first and second chambers communicating with said first and second conduits respectively and both communicating with said bore; said segment also being formed with a recess communicating with said second source and with said bore;

said spool including a central land cooperating with said segment to close said chambers and said recess from communication with said bore when in a reference position and to open said first and second chambers to said bore on opposite sides of said land upon displacement of said spool from said reference position in first and second directions respectively and to open said recess to said bore, simultaneously with the opening of either of said chambers; and said housing including first and second ports communicating with said bore on opposite sides of said reference position of said land and communicating with [firs] *first* and second load conduits respectively, whereby, upon receipt of a signal said first stage generates a pressure differential which displaces said spool causing fluid to flow from one of said conduits to said load and also from said second source to said load.

27. A valve in accordance with claim 26 in which first and second centering springs bear against opposite ends of said spool to maintain in a reference position in the absence of a signal having a predetermined threshold magnitude.

*28. A system for controlling the flow of fluid to a load, comprising,*

*a control fluid circuit including a conduit and including means responsive to an input signal for generating a fluid control pressure in said conduit, said control fluid circuit also including means defining a first restricted passageway interconnecting said conduit and said load,*

*a main fluid circuit including a main source of fluid under pressure and including means defining a second restricted passageway interconnecting said source and said load,*

*a source of biasing pressure substantially equal in pressure to that of said source, and*

*means responsive to the difference in pressure between that of said control pressure in said conduit and that of said biasing pressure for varying the sizes of said first and second passageways simultaneously in the same sense.*

*29. A system in accordance with claim 28 in which said source of biasing pressure is said main source.*

*30. A system in accordance with claim 28 in which said control fluid circuit includes an additional source of fluid under a pressure greater than that of said main source.*

*31. A system in accordance with claim 30 which includes means for controlling the relative pressure of said main and additional sources so that the pressure of said additional source is an approximately constant amount greater than that of said main source.*

*32. A system in accordance with claim 30 in which said control circuit includes means defining a third restricted passageway connected between said additional source and said conduit.*

*33. A system in accordance with claim 32 including means for varying the size of said third passageway in response to said input signal.*

*34. A system in accordance with claim 32 in which said third restricted passageway is fixed in size and which includes means defining a fourth restricted passageway variable in response to said input signal and connected between said conduit and fluid return.*

References Cited

The following references, cited by the Examiner, are of record in the patented file of this patent or the original patent.

UNITED STATES PATENTS

| | | | |
|---|---|---|---|
| 3,054,388 | 9/1962 | Blanton | 137—85 X |
| 3,218,805 | 11/1965 | Pruvot | 60—386 |
| 3,228,423 | 1/1966 | Moog | 137—625.62 |
| 3,357,444 | 12/1967 | Zeuner | 137—625.62 X |
| 3,363,366 | 1/1968 | Estabrook | 137—83 X |
| 3,464,318 | 9/1969 | Thayer et al. | 137—625.62 |

HENRY T. KLINKSIEK, Primary Examiner

U.S. Cl. X.R.

137—625.63, 625.64